UNITED STATES PATENT OFFICE 2,617,735

CORN FRITTER BATTER AND PROCESS OF MAKING SAME

Ernest W. Myers, Dayton, Ohio

No Drawing. Application November 1, 1949,
Serial No. 124,947

10 Claims. (Cl. 99—192)

This invention relates to corn fritters and to the method of preparing and preserving the batter for the corn fritters.

It is an object of this invention to prepare a ready mixed corn fritter batter which contains all of the necessary ingredients for making tasty corn fritters.

Another object of the invention is to prepare the corn so as to avoid using any of the hulls from the corn kernels.

Still another object of this invention is to provide an improved ready mixed type of corn fritter batter which may be frozen without the need for blanching or otherwise treating the corn.

Other objects and advantages reside in the construction of parts, the combination thereof and the mode of operation, as will become more apparent from the following description.

It is now well-known that whole kernel sweet corn can successfully be preserved by freezing and then used in making corn fritters, but heretofore it has been common practice to cut the kernels off from the cob, blanch the whole kernel corn, and to freeze it before mixing the corn with other ingredients. The hulls of the corn, however, are objectionable, not only because they are hard to digest and detract from the textures of the batter, but also because they have been contaminated by exposure to bacteria in the air and sometimes even vermin, with the result that if they are used they should be blanched before being frozen. Such blanching sets the milk in the corn and adversely affects the flavor of the corn. I have found that it is possible to remove the uncontaminated pulp and germ of the corn kernels while leaving the hulls intact on the cob and to successfully freeze the pulp and germ after mixing the same with other ingredients, as will be explained hereinafter.

In accordance with my method, select white or yellow sweet corn that has matured, but in which the milk has not set, is first cleaned thoroughly but not blanched. After the corn has been cleaned, the caps of the kernels are opened by rubbing the cob over a grater or similar instrument in such a manner that none, or only a small portion, of the hull cap is removed. This is followed by scraping the corn to remove the pulp and germ of the corn kernels from the cob, leaving the hulls intact on the cob. In removing the pulp and germ, it is preferable to use a dull knife or some other similar scraping tool.

To each 8 pounds of corn pulp and germ thus prepared, there is added 1 pound of flour, which has been sifted, with 12 teaspoons of salt and 2 teaspoons of ground black pepper and 4 teaspoons of baking powder and this is then mixed with 16 well beaten eggs (approximately 2 pounds by weight). These ingredients are mixed until all are thoroughly integrated and then the mixture is packed into containers and quick-frozen at once without any blanching or other treatment.

Any standard commercially available baking powder may be used. These powders consist of a mixture of baking soda and an acid substance such as cream of tartar, with a "filling" of starch or flour. The baking powder serves as a leavening agent which performs its usual intended function.

In using the frozen corn fritter batter described hereinabove, the batter is allowed to thaw to a mushy consistency and then is preferably fried in tablespoon lots on a slightly greased griddle which is just hot enough to nicely brown the corn fritter on both sides. The fritters are then served hot with butter alone or in addition to any other preparation, such as syrup, jelly or honey, which one may wish to use.

The proportions given hereinabove may be varied somewhat and while the salt, pepper and baking powder are preferably added to the original batter before it is frozen, certain aspects of my invention are equally applicable to batters in which these condiments are added just before baking. However, by adding these condiments when preparing the original batter, the user of the batter can fry the batter immediately without adding any further ingredients of any kind. The proportions can be varied to compensate for differences in the amount of milk in the corn, the size of the eggs used, individual preferences in the thickness of the batter, et cetera, but generally the proportions given herein will produce excellent results.

While the preferable arrangement is to fry the batter in tablespoon lots on a slightly greased griddle, the batter may also be used in preparing corn fritters which are fried in deep fat. The term "cooking" is used herein in its broader sense and consequently comprises frying on a griddle as well as frying in deep fat.

The frozen batter is ideally suited for sale in grocery stores and the like, as the housewives are not required to add anything more whatsoever to the batter before frying the same.

By virtue of the above described method, it is obvious that a batter having an improved texture has been provided and that nothing is done to the corn which would in any way impair the flavor of the corn whereby the fritters made from the batter are especially delicious.

Although the preferred embodiment of the process has been described, it will be understood that within the purview of this invention various changes may be made in the form, proportion and ingredients and the combination thereof, which generally stated consist in a method and a compound capable of carrying out the objects set forth, as disclosed and defined in the appended claims.

Having thus described my invention, I claim:

1. The process of manufacturing corn fritter batter adapted to be kept in frozen storage, which process consists in opening the caps of kernels of corn while still on the cob, removing the pulp and germ of the corn kernels from the cob while leaving the hulls intact on the cob, forming a batter by mixing ingredients in substantially the following proportions: 8 pounds of said corn pulp and germ, 1 pound of flour, 12 teaspoons of salt, 2 teaspoons of ground black pepper, 4 teaspoons of baking powder, and 16 well beaten eggs; mixing the same together, and then freezing the mixture.

2. The process of preparing and preserving corn fritter batter in a frozen state, which process consists in opening the caps of kernels of corn before the milk has set, scraping the kernels to remove the pulp and germ of the corn kernels from the cob while leaving the hulls intact on the cob, adding to the pulp and germ, flour, seasoning, a leavening agent, and well beaten eggs to form a batter, wrapping the batter, and then freezing the wrapped batter.

3. The process of preparing and preserving corn fritter batter in a frozen state, which process consists in removing the pulp and germ of the corn kernels from the hulls, adding to the pulp and germ, flour and eggs, mixing the flour, eggs, pulp and germ together to form a batter, and then freezing the batter.

4. The process of preparing and preserving corn fritter batter in a frozen state, which process consists in opening the caps of kernels of corn before the milk has set, scraping the kernels to remove the pulp and germ of the corn kernels from the cob while leaving the hulls intact on the cob, mixing the unblanched fresh sweet corn with flour, seasoning, a leavening agent, and well beaten eggs, in the approximate ratio by weight of about 8 parts of corn to 1 part of flour and 2 parts of eggs, and then freezing the batter.

5. The process of preparing and preserving corn fritter batter in a frozen state, which process consists in opening the caps of kernels of corn before the milk has set, scraping the kernels to remove the pulp and germ of the corn kernels from the cob while leaving the hulls intact on the cob, mixing the unblanched fresh sweet corn with flour, seasoning, a leavening agent, and well beaten eggs, in the approximate ratio by weight of about 8 parts of corn to ½ to 2 parts of flour and 1 to 3 parts of eggs, and then freezing the batter.

6. The process of preparing and preserving corn fritter batter in a frozen state, which process comprises opening the caps of the kernels of corn while on the cob, removing the pulp and germ from the hulls, thereafter mixing the pulp and germ with ingredients to form a corn fritter batter, and freezing the mixture.

7. The process of preparing corn for use in preparing corn fritters and of preserving the corn fritter batter while frozen, which process comprises opening the caps of kernels of corn while on the cob, removing the pulp and germ of the corn kernels from the cob while leaving the hulls intact on the cob, and thereafter packaging and then freezing the pulp and germ without blanching the pulp and germ.

8. The process of preparing and preserving corn fritter batter in a frozen state, which process consists in removing the pulp and germ of the corn kernels from the hulls, adding flour and eggs, and mixing the flour, eggs, pulp and germ together, and then freezing the mixture.

9. As an article of manufacture, frozen corn fritter batter comprising flour, pulp and germ without the hulls of kernels of sweet corn, eggs, seasoning, and baking powder, the flour being present approximately in the ratio of 1 pound of flour to each 8 pounds of corn and 2 pounds of raw eggs.

10. As an article of manufacture, a consumer package comprising pulp and germ without the hulls of kernels of sweet corn, flour, eggs, and seasoning material combined into a mixture having the consistency of corn fritter batter, the mixture thereof being enclosed to retard evaporation therefrom, and frozen within a carton or the like.

ERNEST W. MYERS.

REFERENCES CITED

The following references are of record in the file of this patent:

UNITED STATES PATENTS

| Number | Name | Date |
|---|---|---|
| 2,000,892 | Lewis | May 7, 1935 |

OTHER REFERENCES

Lord: Everybody's Cook Book, Harcourt, Brace and Co., N. Y., 1937, pages 339, 343.

Anderson: Quick Frozen Foods, February 1948, page 114.